ELECTROMAGNETIC RADIATION SENSITIVE ELEMENTS

Filed Aug. 18, 1969

INVENTORS
ROBERT W. HALLMAN
GARY W. KURTZ

By Hauke, Gifford & Patalidis
ATTORNEYS

United States Patent Office 3,707,372

Patented Dec. 26, 1972

3,707,372 ELECTROMAGNETIC RADIATION SENSITIVE ELEMENTS

Robert W. Hallman, Utica, and Gary W. Kurtz, Southfield, Mich., assignors to Teeg Research, Inc., Detroit, Mich.

Continuation-in-part of abandoned application Ser. No. 706,423, Feb. 19, 1968. This application Aug. 18, 1969, Ser. No. 850,972

Int. Cl. G03c 5/00

U.S. Cl. 96—35 7 Claims

ABSTRACT OF THE DISCLOSURE

Electromagnetic radiation sensitive elements comprising essentially a layer of a first material and a second layer of an inorganic material capable when exposed to electromagnetic actinic radiation to form an interreaction product with the material of the first layer, such interreaction product having physical and chemical characteristics different from those of both the first material and the inorganic material. The electromagnetic actinic radiation used for exposure of the elements may be ordinary light, monochromatic light, coherent light, electron beams, ion beams, X-rays, gamma rays, etc., and diverse systems are disclosed for selectively and discretely exposing the elements.

CROSS-REFERENCE TO RELATED APPLICATIONS

The present application is a continuation-in-part of application Ser. No. 706,423, filed Feb. 19, 1968, now abandoned, and is related to application Ser. Nos. 839,038, filed July 3, 1969, 841,416, filed July 14, 1969, 841,718, filed July 15, 1969, 867,575 filed Oct. 20, 1969, 878,846, filed Nov. 21, 1969, 848,676, filed Aug. 8, 1969, 846,212, filed July 30, 1969, 850,184, filed Aug. 14, 1969, and 815,048, filed Apr. 10, 1969.

BACKGROUND OF THE INVENTION

In the co-pending application, Ser. No. 839,038, and the other above mentioned co-pending applications, there are disclosed electromagnetic radiation sensitive elements typically consisting of a metallic layer coated with a layer, as defined therein and herein of an inorganic material capable of interreacting with that of the metallic layer when exposed to incident electromagnetic actinic radiation, as defined hereinafter. Selective and discrete exposure of the electromagnetic radiation sensitive element to actinic radiation in intensity and duration sufficient to cause an interreaction of the irradiated portions of the two layers causes the formation at the irradiated portions of an interreaction product or products having chemical and physical characteristics substantially different from those of the non-irradiated portions of either of the layers.

SUMMARY OF THE INVENTION

The present invention contemplates making diverse articles by appropriately exposing radiation sensitive elements made according to the principle of the aforesaid co-pending applications to an electromagnetic radiation actinic image, such electromagnetic radiation actinic mage being formed by selectively and discretely projecting upon the surface of a radiation sensitive element ordinary light, monochromatic light, coherent light, such as supplied by a laser or the like, particle beams, such as an ion or electron beam, or by means of exposure to infrared or ultraviolet radiation, to any other appropriate electromagnetic actinic radiation such as X-rays, gamma rays and the like.

As a result of such selective and discrete exposure to electromagnetic actinic radiation, the two layers of the electromagnetic radiation sensitive element are caused to interreact at the irradiated areas, resulting in the formation, at such irradiated areas, of an interreaction product having chemical and physical characteristics different from the chemical and physical characteristics of the material of the two layers in their unreacted form.

The change in chemical characteristics of the interreacted areas relatively to the unaffected areas results, for example, in modifications of the chemical reactivity of the materials permitting selective dissolution thereof in appropriate solvents. The changes in physical characteristics result in modified electrical and thermal properties, optical properties, wettability relatively to predetermined liquids, and the like.

The several objects and many advantages of the present invention will become apparent when the accompanying description of some examples of the best modes contemplated for practicing the invention is read in conjunction with the accompanying drawings wherein like reference numerals refer to like or equivalent parts and in which:

DETAILED DESCRIPTION OF THE PREFERRED EMBODIMENTS

Figure 1:
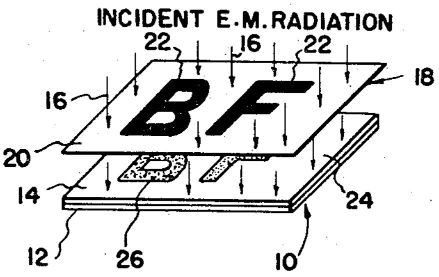
FIG. 1 is a schematic representation in perspective of an electromagnetic radiation sensitive element according to the present invention in the process of being selectively and discretely exposed to electromagnetic actinic radiation through an appropriate mask.

As explained in detail in the aforesaid co-pending applications, electromagnetic radiation sensitive elements, shown generally at 10 in all of the figures of the drawings, comprise essentially two dissimilar layers substantially adhering to each other. One of the layers, for example layer 12, FIG. 1, is a metallic layer having disposed in adhesion and in intimate contact therewith a second layer 14 of an inorganic material capable, when exposed to electromagnetic radiation, of interreacting with the material of the metallic layer 12. For some applications, it is convenient to provide an adequate substrate or support member for the electromagnetic radiation sensitive element 10, such support member consisting of a ragid or flexible material, such as a metal plate or foil, a plastic, paper or cardboard sheet, etc., as explained in the aforesaid co-pending applications.

A list of elements and metals particularly suitable for the metallic layer 12 includes silver, copper, lead, cadmium, zinc, iron, tin, arsenic, bismuth, cobalt, germanium, indium, manganese, mercury, nickel, selenium, silicon, tellurium, thallium, and vanadium. Such metallic layer is in the form of a thin foil or coating on a substrate in structures utilizing such substrate. The thickness of the metallic layer 12 may vary, according to the purpose to be accomplished and according to the proposed use of the sensitive element 10, from a few atoms layers to a fraction of a mil or even to several mils. When using a very thin metallic layer 12 which is substantially "transparent," i.e. which has substantially good transmissivity to the actinic radiation, the sensitive element 10 may be exposed by causing the incident actinic radiation to impinge upon the surface of the metallic layer 12, as well as causing the radiation to impinge upon the surface of the layer 14 of inorganic material.

By "metallic layer" is meant herein a layer containing silicon or any one of the common metals hereinbefore mentioned, either alone, or alloyed to another common metal, or in the form of a metallic mixture. Consequently, the term "metallic layer" as used herein means a material containing at least silicon or one metal in the form hereinbefore indicated.

The layer 14 of inorganic material is also substantially thin, of the order of a few atom layers to several microns, or even a few mils, and it may consist of any one of a variety of ternary and binary inorganic materials and compounds and any one of a few elements. An example of ternary material, which has been found to be particularly suitable, is a glassy material consisting of arsenic, sulfur and iodine, for example, in the following proportions: arsenic—40% by weight, sulfur—50% by weight and iodine—10% by weight, although the proportion of iodine may be within the range of 1 to 30% by weight. Appropriate examples of such ternary materials are given in U.S. Pat. No. 3,024,119, issued Mar. 6, 1962. Chlorine, bromine, selenium, thallium, or tellurium may be substituted for iodine.

A multitude of binary compounds and mixtures have been found to be useful for the inorganic material forming the layer 14. Examples of such binary compounds or mixtures comprise halides of metals, such as copper, antimony, arsenic, sulfur, thallium, lead, cadmium, and silver, and sulfides, arsenides, selenides and tellurides of such metals. The most suitable materials, presenting substantial actinic sensitivity when deposited on a metallic layer of copper, silver, lead, zinc, etc., for example, are arsenic-sulfur mixtures and compounds, antimony-sulfur compounds and mixtures, silver-sulfur compounds and mixtures, bismuth-sulfur compounds and mixtures, chromium-sulfur compounds and mixtures, lead iodide, copper chloride, stannous chloride, mercury chloride, arsenic selenides, selenium-sulfur compounds and mixtures, chromium selenides and indium-sulfur compounds and mixtures. It seems that the property of reacting with a metallic layer under the influence of electromagnetic actinic radiation is shared by a variety of mixtures and compounds, having such property to varying but generally useful degrees. Such binary compounds and mixtures may be generally cataloged as consisting of a metal halide or a mixture of a metal with a halogen, metal selenide or a mixture of a metal with selenium, metal sulfide or a mixture of a metal with sulfur, and metal telluride or a mixture of a metal with tellurium. Stoichiometric proportions are not critical, but it is preferable that the resulting material be substantially transparent to electromagnetic actinic radiations of an appropriate wavelength, specially when the overlayer is substantially thick.

Single elements, such as halogens, are also capable of reacting with a metallic layer when exposed to electromagnetic actinic radiation.

A general grouping of inorganic materials suitable for forming an actinically reactive layer when disposed on a metallic layer therefore consists of halogens, sulfur, selenium, M—X compounds and mixtures and M—X—Y compounds and mixtures, wherein M is a metal and X and Y are selected from the group consisting of a halogen, sulfur, selenium and tellurium; the metal M in the compounds and mixtures is selected from the group consisting of arsenic, antimony, bismuth, selenium, tellurium, copper, zinc, cadmium, mercury, lead, chromium, gallium, indium, thallium, germanium, tin, iron, cobalt, nickel and silver.

A particularly suitable binary material presenting substantial sensitivity when deposited on a layer of silicon or silver, copper, cadmium, lead, zinc, or other metal is an arsenic-sulfur compound or mixture in a glassy or vitreous form and which presents remarkably good radiation transmissivity from the infrared to the ultraviolet region of the electro-magnetic spectrum. For example, by using a vitreous overlayer 14 of arsenic-sulfur deposited upon a metallic layer 12 of silver, the quality of the relief image obtained in the fiinished article is remarkable in its resolution which may be as low as 500–1000 A. This is a very important quality when the finished article must present a high resolution, as will be the case, for example, if the finished article is a diffraction grid or grating, or the like. The proportions of arsenic and sulfur may be any adequate proportions which permit to obtain a vitreous material, such proportions preferably ranging from about 40% arsenic–60% sulfur by weight to 70% arsenic–30% sulfur by weight.

In copending application Ser. No. 839,038 filed July 3, 1969, there is disclosed several examples of preparation of electromagnetic radiation sensitive elements according to the invention. Elements such as element 10 of FIG. 1 herein may be prepared typically as follows:

If it is desired to make an electromagnetic radiation sensitive element provided with a support member or substrate, a plate of aluminum or any other appropriate material, constituting the substrate of any appropriate dimension, one or two mils thick, for example, is placed in a bell par evacuated at about .5 micron pressure. Silver metal or other metal is evaporated from tungsten electrical resistance heaters brought to about 1100° C. by the passage of electrical current therethrough, a silver coating or ribbon being disposed on the tungsten filament. By evaporating the metal for about three seconds, a metallic layer 12 on the substrate is obtained, having a thickness of about 4000 A. Longer evaporation times provide proportionally thicker metallic layers. For example, fifteen to twenty seconds evaporation time provides metallic layers on the substrate having a thickness of approximately one micron. The thickness of the thin film or layer 12 of metal can be continuously monitored by means of a thickness monitor.

Vapor deposition techniques may also be used for depositing on the top of the metallic layer 12 an overlayer 14 of any of the inorganic materials hereinbefore listed. For example, the substrate having a superficial layer of silver 12, or other metal, thereon or, alternately, a metallic plate or foil is placed in a bell jar evacuated at about .1 micron pressure. A quartz crucible is placed in the bell jar in an electrical resistance heater and is loaded with pieces of the inorganic material, such as, for example, arsenic trisulfide, $As_2S_3$. The surface of the metallic layer 12 is typically located at a distance of about six inches from the quartz crucible. The arsenic trisulfide is heated in the crucible to about 350° to 400° C., and a thin film of arsenic trisulfide, forming the layer 14, is deposited on the surface of the silver layer 12 by evaporating the arsenic trisulfide from the quartz crucible for about 30 to 40 seconds, thus providing a thickness of the layer 14 of approximately 4,000 A. Longer deposition times provide greater thickness of the layer 14, while shorter deposition times provide proportionally thinner overlayers.

Any one of the herein mentioned inorganic materials may be substituted for the arsenic trisulfide, and other techniques may be used for depositing the layer 14 upon the metallic layer 12. For example, the inorganic material may be dissolved in an appropriate solvent and painted or sprayed over the surface of the metallic layer, or cathode sputtering and other techniques may be used with equal success.

As shown in FIG. 1, the electromagnetic radiation sensitive element 10 may be exposed to the action of incident electromagnetic actinic radiation 16 through an appropriate mask 18 provided with portions, such as shown at 20, which are substantially transmissive of the incident actinic radition and other portions, such as shown at 22, which are substantially non-transmissive of such electromagnetic radiation. Consequently, the surface of the electromagnetic radiation sensitive element 10 is subjected to selective and discrete exposure to the incident electromagnetic actinic radiation 16, such that some areas thereof, as shown at 24, are irradiated, while other areas, as shown at 26 and corresponding to the portions 22 of the mask which are non-transmissive of the electromagnetic radiation, are substantially shielded therefrom. The face of the electromagnetic radiation sensitive element 10 subjected to the action of the electromagnetic actinic radiation 16 may be the face formed by the second layer 14, which may be in any physical form, either solid, liquid or gaseous, or, alternately, the metallic layer 12 may be subjected to the action of impinging electromagnetic radiation, in a selective and discrete manner, on the condition that such metallic layer 12 be substantially transmissive of the electromagnetic actinic radiation utilized, such that at the interboundary between the two layers there may be caused a selective and discrete interreaction between the materials of the two layers at the irradiated areas. The incident electromagnetic actinic radiation may be in the invisible or the visible light spectrum from the infrared region to the ultraviolet region, and it may be either coherent or incoherent light, monochromatic light, or the like. The source of incident electromagnetic radiation, not shown, may thus be an incandescent lamp, an electric arc, a laser, etc. It may also be a source of X-rays, or a radioactive isotope providing gamma rays or the like.

Figure 2:
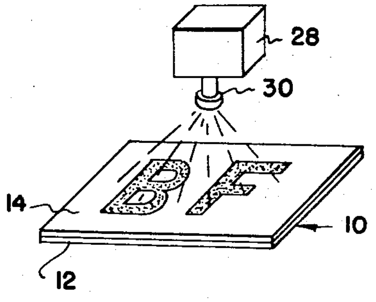
FIG. 2 is a schematic representation in perspective of an electromagnetic radiation sensitive element according to the present invention in the process of being selectively and discretely exposed to electromagnetic actinic radiation by way of an electromagnetic radiation actinic image being projected thereon.

Alternately, an image may be projected upon the surface of the electromagnetic radiation sensitive element 10, as shown in FIG. 2, by any convenient means such as a projector 28 having a convenient source of illumination, not shown, and adapted to project an image by means of a lens system 30. Such an arrangement may consist of a projector 28 in a well known form, such as a slide projector, a continuous strip projector, an enlarger, an opaque projector, or the like.

Figures 3, 4, 5, 6:
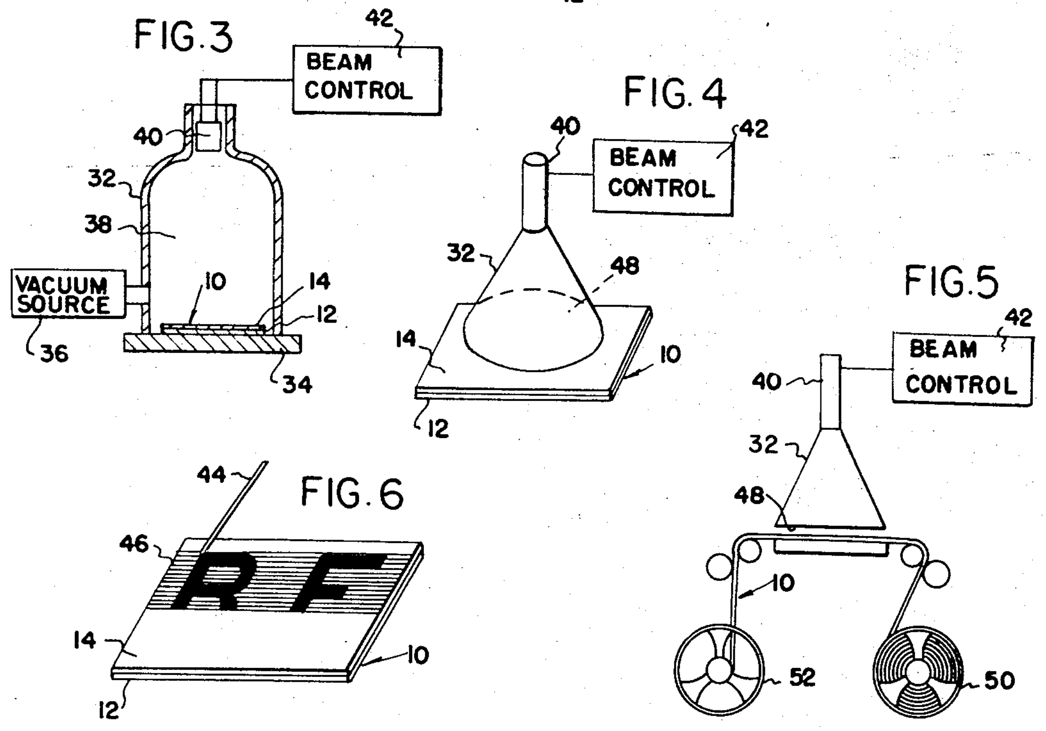
FIG. 3 is a schematic representation of an arrangement utilizing an electromagnetic radiation sensitive element according to the present invention in the process of being selectively and discretely exposed to electromagnetic actinic radiation consisting of an energy beam in a vacuum, such as an electron beam.
FIG. 4 is a view of an arrangement similar to the arrangement of FIG. 3 but wherein the electromagnetic radiation sensitive element is disposed externally to the vessel containing the electron beam source.
FIG. 5 is a view of an arrangement similar to the arrangement of FIG. 4, but wherein the electromagnetic radiation sensitive element is in the form of an elongated pliable member.
FIG. 6 is a schematic representation of an electromagnetic radiation sensitive element in the process of being exposed to electromagnetic actinic radiation caused to scan the surface thereof in a predetermined pattern.

Referring now to FIG. 3, there is shown in a schematic diagrammatic form an arrangement suitable for exposure of an electromagnetic radiation sensitive element 10 to an energy beam, such as an ion or electron beam. Such an arrangement consists, for example, of a bell jar or other vessel 32 provided with a removable and sealable base 34. A source of vacuum 36 is connected to the interior 38 of the bell jar or vessel 32 for the purpose of maintaining therein an appropriate low pressure atmosphere, of the order of $10^{-2}$ to $10^{-8}$ mm. of mercury, for example. Alternately, for some applications, the interior 38 of the bell jar or vessel 32 may be filled with an inert gas.

The bell jar or vessel 32 is provided, in the interior thereof, with an ion or electron source 40 including a beam forming and control element connected to a beam control means 42. Such an arrangement is conventional and is well known in the cathode ray tube art and in the electronic microscope art.

By way of the arrangement of FIG. 3, the electromagnetic radiation sensitive element 10 disposed on the base 34 in the interior 38 of the bell jar or vessel 32 is adapted to be subjected to ion or electron bombardment by the ion or electron beam originating from the ion or electron source 40 under the control of the beam control 42. The electromagnetic radiation sensitive element 10 may be subjected to such an ion or electron beam bombardment through an appropriate mask, not shown, so as to provide discrete and selective irradiation of appropriate areas of the element, or preferably, the electromagnetic radiation sensitive element 10 may be subjected to the ion or electron beam bombardment in a selective and discrete manner by appropriate control scanning of the surface thereof by means of a thin beam of ions or electrons modulated in intensity and appropriately deflected under the control of beam control 42, according to conventional systems available in the CRT and information recording art. As shown in FIG. 6, the scaning of the surface of electromagnetic radiation sensitive element 10 may be effected by means of a narrow beam 44 of ions or electrons such beam being adequately deflected and caused to scan "lines," as arbitrarily represented at 46, along a surface of the element, the beam being further controllably modulated so as to controllably interrupt the flow of ions or electrons to prevent impinging thereof on the surface of the radiation sensitive element at the areas which are sought not to be exposed, while the ions or electrons are allowed to impinge upon the surface of the element at the areas which are sought to be exposed. The beam control and deviation system provides for adequate retrace of the beam so as to scan every successive line 46.

FIG. 4 schematically represents an arrangement substantially alike the arragement of FIG. 3 wherein, however, the electromagnetic radiation sensitive element 10 is disposed on the outside of a vessel 32 having a face 48 adapted to be transmissive of the beam. Such an arrangement may consist of what is known as a Leonard type tube, which is substantially similar to a conventional CRT tube, which is provided with a face 48 thin enough and made of a suitable material, such as titanium, which allows transmission of electrons and still maintains the necessary vacuum within the tube.

FIG. 5 represents, schematically, an arrangement substantially alike the arrangement of FIG. 4, with the exception of the electromagnetic radiation element 10 being in the form of a pliable elongated member, such as described in detail in co-pending application Ser. No. 642,-972, filed June 1, 1967, now abandoned, and in its continuation application, Ser. No. 867,575, filed Oct. 23, 1970. Such an elongated pliable electromagnetic radiation sensitive element 10 may consist of a paper support provided with a thin coating of silicon or metal, such as silver, in turn provided with a thin coating of an inorganic material, such as arsenic trisulfide or arsenic pentasulfide, for example, capable of reacting with silicon or the metal when exposed to electromagnetic radiation. By means of the arrangement of FIG. 5, the elongated electromagnetic radiation sensitive element 10 is adapted to being fed from a supply reel, as shown at 50, to a take-up reel 52 by means of a feed mechanism, not shown, and information may be recorded on the surface of the radiation sensitive element in a continuous manner or intermittently as is well known in the information recording and storing art.

Figure 8:
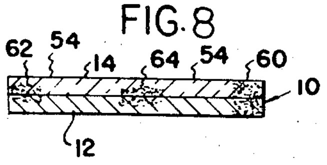
FIGS. 7 and 8 are schematic views in section of a portion of an electromagnetic radiation sensitive element after exposure to electromagnetic actinic radiation.
Figure 7:
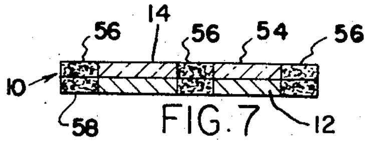

FIG. 7 illustrates in a schematic manner a sectional view through an electromagnetic radiation sensitive element 10 according to the present invention after selective and discrete exposure to electromagnetic actinic radiation. The areas not subjected to irradiation, as shown at 54 for example, remain undisturbed, while at the areas subjected to irradiation, as shown at 56, there is caused an interreaction between the material of the metallic layer 12 and the inorganic material of layer 14 such that the resulting interreaction product 58 has chemical and physical characteristics different from those of the unaffected portions of both the layer 12 and the layer 14. In FIG. 7, the exposed electromagnetic radiation element 10 is shown after exposure to electromagnetic actinic radiation causing a complete interreaction, at the irradiated areas 56, between the diverse components of the two layers, while in FIG. 8, there is illustrated, schematically, the results achieved by exposure of the electromagnetic radiation sensitive element 10 to electromagnetic actinic radiation of varied intensity, or alternately, of varied duration. Areas such as shown at 60 have been exposed for a time and at an intensity sufficient to cause complete and irreversible reaction between the components of the two layers, while at areas 62 and 64 there are shown diverse degrees of irradiation in intensity and duration insufficient to cause a complete reaction. Consequently, in FIG. 8, the chemical and physical characteristics of areas 60, 62 and 64 are not only different from the chemical and physical characteristics of the unaffected areas 54, but also show differences between one another.

Such differences in chemical and physical characteristics result in differences in chemical reactivity to, for example, appropriate solvents, such that the irradiated areas may be dissolved selectively, leaving undisturbed the non-irradiated areas, or the irradiated areas and non-irradiated selected areas of one of the layers may be dissolved at will.

The changes in physical characteristics may be electrical or thermal changes, optical changes, or changes in wettability. The latter is particularly described in co-pending application Ser. No. 850,184, filed Aug. 14, 1969, and permits to obtain, by way of the electromagnetic radiation sensitive element of the invention and of the methods of the invention, lithographic plates and the like having areas provided with diverse oleophilic and hydrophilic characteristics. The electrical characteristics changes result from, among others, changes of the specific resistivity of the materials of the exposed areas of the radiation sensitive element as a result of selective and discrete exposure to the electromagnetic radiation. Such changes in resistivity permit to obtain, by means of the present invention, electical printed circuits having integral electrical components, such as resistors and capacitors of appropriate predetermined values. The changes in specific resistivity also permit to utilize the invention in information storage systems wherein the information is recorded on the element in any appropriate manner and is read by differentiation between the resistivities of the diverse areas, substantially alike storage systems utilizing magnetic tape or punched tape.

Figure 9:
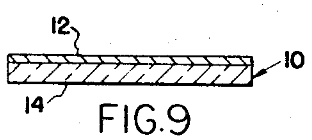
FIGS. 9 and 10 are schematic views of an alternate electromagnetic radiation sensitive element according to the present invention before and after exposure to electromagnetic actinic radiation.
Figure 10:
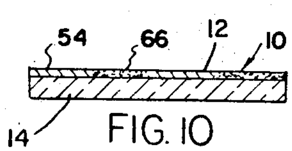

Other physical changes experienced by the electromagnetic radiation sensitive elements according to the present invention as the result of exposure to electromagnetic actinic radiation are of an optical nature. For example, an electromagnetic radiation sensitive element, as shown at FIG. 9, consisting of a metallic layer 12, made for example of any one of the metals enumerated above such as silver, provided with a layer 14 made of an inorganic material such as, for example, arsenic trisulfide or arsenic pentasulfide, is prepared so as to have a metallic layer 12 of a thickness tailored to provide, for example, a transmissivity of one percent, or any other adequate percentage, of a predetermined electromagnetic actinic radiation, such as ordinary light. After exposure to electromagnetic actinic radiation for a predetermined period of time and at a predetermined intensity, the interreaction between the metal of the metallic layer 12 and the inorganic material of the layer 14 causes the element 10 to become, for example, fifty percent transmissive of the radiation. It can thus be seen that transmission filters may be made according to the principles of the present invention, or alternately, such changes in optical quality of the electromagnetic radiation sensitive element 10 may be used to advantage in optical recording and optical reading of information stored in an appropriate code or pattern in the electromagnetic radiation sensitive element. As a result of discrete and selective exposure to the appropriate electromagnetic actinic radiation in an appropriate pattern and for a duration and intensity sufficient to cause interreaction between the materials of the two layers, the resulting exposed electromagnetic radiation sensitive element is substantially in the form shown schematically at FIG. 10, wherein the unaffected areas 54 remain substantially non-transmissive while the exposed areas 66 have become substantially transmissive.

It has been discovered that at least some of the materials suitable for the layer 14 exhibit considerable chemical and physical transformations when exposed to electromagnetic actinic radiation or particle bombardment, even though the metallic layer is omitted. Examples of such materials include arsenic sulfides such as arsenic monosulfide, arsenic disulfide, arsenic trisulfide and arsenic pentasulfide, and antimony sulfides, silver sulfides, bismuth sulfides, chromium sulfides, lead iodide, copper chloride, mercury chloride, arsenic selenides, and arsenic-sulfur, selenium-sulfur, arsenic-sulfur-halogen and arsenic-sulfur-antimony oxide mixtures. When using such materials, the silicon or metal layer may be omitted, if so desired, without departing from the spirit and scope of the invention. Vapor deposited layers, whether or not on a reactive silicon or metallic underlayer, are among the most sensitive to electromagnetic actinic radiations, seemingly resulting from particular molecular structure caused by the rapid cooling of the thin layer deposited on the substrates.

Example I

Samples were prepared of electromagnetic radiation sensitive elements according to the present invention, consisting of a thin film of silver, of a thickness of about 3000 A. as measured by means of a thin film thickness monitor, deposited on polished glass substrates, according to the vacuum deposition methods hereinbefore described. Arsenic pentasulfide was vacuum deposited onto the surface of the silver thin film, to a thickness of about 9000 A., also according to the methods hereinbefore described. The samples were exposed to filtered white light from a 30 watt incandescent lamp. The filter interposed between the light source and the samples was chosen such that only the infrared portion of the light spectrum was allowed to impinge on the surface of the samples. It was determined that the infrared energy emitted in radiant form by the light source amounted to about 20% of the total energy emitted by the source. Accordingly, the samples were exposed for at least 5.5 times as much exposure time as would be the case utilizing the same source without the filter. Exposure time of 30 minutes to an hour was required.

The resultant exposure to infrared actinic radiation achieved the same results as those obtained by exposure to ordinary white light. For sufficiently long exposure times all of the silver film down to the glass substrate was consumed as a result of interreacting with the arsenic pentasulfide layer, with the formation of interreaction product.

Example II

Some of the samples prepared, as explained in Example I, were exposed to a coherent light source instead of being exposed to infrared radiation. The coherent light source was a three milliwatt helium-neon laser with a 6328 A emission wavelength. The samples required very little exposure time, about 15 to 20 seconds to consume in depth all of the silver layer. The results achieved were for all purposes similar to those obtained as a result of exposure to white light or exposure to infrared radiation.

Example III

Samples were prepared according to the hereinbefore mentioned vacuum deposition techniques, such samples consisting of a layer of copper about 1500 A. thick, deposited on a glass substrate, and provided with a 5000 A. thick layer of copper chloride over the copper layer. The samples were exposed to the light emitted by a mercury vapor source. The mercury vapor source emitted light at 3950 A. with very small amounts of radiation emitted at higher wavelengths. The results achieved by such exposure were partial or complete photo-consumption of the metallic copper layer, depending on the exposure time, and were identical to those achieved by exposing control samples to ordinary white light, the depth of photo-consumption depending upon the length of the exposure time, such exposure time being generally shorter than the exposure times required by white light or infrared radiation. Exposure times ran from several seconds to a few minutes.

Example IV

Several diverse samples were prepared, all provided with a glass substrate, by the vacuum deposition techniques hereinbefore explained. A first group of samples consisted in a lead iodide coating over a silver layer, a second group consisted of arsenic trisulfide over a silver layer, a third group consisted of arsenic pentasulfide over a silver layer, a fourth group consisted of copper chloride over a copper layer, and a fifth group of samples consisted of cuprous iodide over a copper layer. The diverse samples were exposed to an electron beam, the energy level of which could be controlled. The electron beam could also be controlled in terms of its intensity (i.e. the number of electrons by cubic centimeter) thus providing complete control of the exposure parameters. It was observed that utilizing an electron beam for exposure of the samples, at least a minimum energy level had to be achieved for interreaction of each metal-inorganic material layer combination subjected to the electron beam bombardment.

Once the appropriate energy level was achieved or exceeded, the reaction between the inorganic material and the metal proceeded at a rate solely determined by the intensity of the electron beam. The areas of the samples subjected to the electron beam bombardment of at least the threshold energy level caused interreaction between the metallic layer and the inorganic material layer with the formation of interreaction product in the exposed areas, while the unexposed areas remain undisturbed. The property changes of the exposed areas were in all respects alike the property changes obtained by exposure to ordinary white light, infrared radiation, ultraviolet radiation, and coherent light.

Example V

Samples of the various radiation sensitive elements of the same structures as in Example IV were exposed to a source of alpha particles. The source of alpha particles was a polonium source of 1-curie level, and exposure for about 30 minutes resulted in interreaction between the inorganic material layer and the metallic layer, producing an interreaction product having properties similar to those previously described. It is to be noted that the source of energy does not produce energy of a wave-like nature, but that the energy provided by the source is rather the kinetic energy of the alpha particles and their electropositive character. With a relatively thin inorganic material layer, of the order of a few angstroms in most cases, the alpha particles were able to penetrate to a sufficient depth to produce a reaction site resulting in the chemical combining of the inorganic material with the metal of the metallic layer.

It can thus be seen that the radiation sensitive elements and the methods of using the same according to the present invention provide means for practical applications.

Having thus described the invention by a few examples thereof, given for illustrative purpose only, what is sought to be protected by United States Letters Patent is as follows:

1. A method for making a useful article by causing an interreaction between a pair of dissimilar adjoining layers of inorganic materials forming an electromagnetic radiation sensitive element, said interreaction forming an interreaction product exhibiting physical and chemical characteristics different from those of said inorganic materials, wherein the material of one of said layers is selected from the group consisting of silver, copper, lead, cadmium, zinc, iron, tin, arsenic, bismuth, cobalt, germanium, indium, manganese, mercury, nickel, selenium, silicon, tellurium, thallium and vanadium, the material of the other of said layers is different from that of the first mentioned layer and is selected from the group consisting of sulfur, selenium, M—X compounds and mixtures and M—X—Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, at least one of said layers being transmissive of said actinic radiation, said method comprising exposing said element discretely and selectively to actinic radiations belonging to the class consisting of ordinary light, monochromatic light, coherent light, ultraviolet light, infrared light, ion beam, electron beam, X-ray energy and energy from a radioactive source, with an intensity and for a period of time sufficient for causing said interreaction between the layers, maintaining said radiation sensitive element substantially at room temperature while exposing to said actinic radiations and removing the interreaction product.

2. A method for making a useful article by exposing an electromagnetic radiation sensitive element comprising a layer of inorganic material capable when exposed to electromagnetic actinic radiations to exhibit physical and chemical characteristics different from those of said material not exposed to electromagnetic actinic radiations, wherein said material is selected from the group consisting of arsenic sulfides, antimony sulfides, silver sulfides, bismuth sulfides, chromium sulfides, lead iodide, copper chloride, mercury chloride, arsenic selenides, and arsenic-sulfur, selenium-sulfur, arsenic-sulfur-halogen and arsenic-sulfur-antimony oxide mixtures, said method comprising exposing said element discretely and selectively to said actinic radiations belonging to the class consisting of ordinary light, coherent light, ultraviolet light, infrared light, ion beam, electron beam, X-ray energy and energy from a radioactive source, with an intensity and for a period of time sufficient to cause said different physical and chemical characteristics, and placing said exposed element in contact with a solvent adapted to selectively act on said material according to said difference in said physical and chemical characteristics after exposure.

3. The method of claim 1 wherein said interreaction product is removed by selective chemical action of a solvent.

4. The method of claim 3 further comprising removing the unreacted portions of at least one layer by selective chemical action of a solvent.

5. The method for making a lithographic plate by causing an interreaction between a pair of dissimilar adjoining layers of inorganic materials forming an electromagnetic radiation sensitive element, said interreaction forming an interreaction product exhibiting physical and chemical characteristics different from those of said inorganic materials, wherein the material of one of said layers is selected from the group consisting of silver, copper, lead, cadmium, zinc, iron, tin, arsenic, bismuth, germanium, indium, manganese, nickel, selenium, silicon, tellurium, thallium and vanadium, the material of the other of said layers is different from that of the first mentioned layer and is selected from the group consisting of sulfur, M—X compounds and mixtures and M—X—Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, at least one of said layers being transmissive of said actinic radiation, said method comprising exposing said element discretely and selectively to actinic radiations belonging to the class consisting of ordinary light, monochromatic light, coherent light, ultraviolet light, infrared light, ion beam, electron beam, X-ray energy and energy from a radioactive source, with an intensity and for a period of time sufficient for causing said interreaction between the layers, wetting the surface of said element and inking said surface.

6. A method of storing information in an electromagnetic radiation sensitive element formed of a pair of adjoining layers of dissimilar inorganic materials one of which has a relatively low electrical resistivity and the other of which has a relatively high electrical resistivity, said dissimilar materials being capable of interreacting when exposed to actinic radiation for forming an interreaction product exhibiting an electrical ressitivity intermediate those of said inorganic materials, wherein the material of one of said layers which has a relatively low electrical resistivity is selected from the group consisting of silver, copper, lead, cadmium, zinc, iron, tin, arsenic, bismuth, cobalt, germanium, indium, manganese, mercury, nickel, selenium, silicon, tellurium, thallium and vanadium, the material of the other of said layers which has a relatively high electrical resistivity is different from that of the first mentioned layer and is selected from the group consisting of sulfur, selenium, M—X compounds and mixtures and M—X—Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, at least one of said layers being transmissive of said actinic radiation, said method comprising recording said information by exposing said element discretely and selectively to actinic radiations belonging to the class consisting of ordinary light, monochromatic light, coherent light, ultraviolet light, infrared light, ion beam, electron beam, X-ray energy and energy from a radioactive source, with an intensity and for a period of time sufficient for causing discretely and selectively said interreaction between the layers causing the formation of a predetermined amount of said interreaction product of said intermediate electrical resistivity, and reading said information by electrically sensing the discrete changes in electrical resistivity characteristics of said element resulting from said interreaction.

7. A method for making a lithographic plate by means of an electromagnetic radiation sensitive element comprising a layer of inorganic material capable when exposed to electromagnetic actinic radiations to exhibit hydrophilic and oleophilic characteristics different from those of said material not exposed to electromagnetic actinic radiations, wherein said material is selected from the group consisting of arsenic sulfides, antimony sulfides, silver sulfides, bismuth sulfides, chromium sulfides, lead iodide, copper chloride, mercury chloride, arsenic selenides, and arsenic-sulfur, selenium-sulfur, arsenic-sulfur-halogen and arsenic-sulfur-antimony oxide mixtures, said method comprising exposing said element discretely and selectively to said actinic radiations belonging to the class consisting of ordinary light, coherent light, ultraviolet light, infrared light, ion beam, electron beam, X-ray energy and energy from a radioactive source, with an intensity and for a period of time sufficient to cause said different hydrophilic and oleophilic characteristics, wetting the surface of said element, and inking said surface.

References Cited

UNITED STATES PATENTS

| | | | |
|---|---|---|---|
| 2,844,493 | 7/1958 | Schlosser | 96—1.5 X |
| 2,962,376 | 11/1960 | Shaffert | 96—1.5 X |
| 3,082,085 | 3/1963 | Miller et al. | 96—1.5 |
| 3,170,790 | 2/1965 | Clark | 96—1.5 |
| 3,312,548 | 4/1967 | Straughan | 96—1.5 |
| 3,317,409 | 5/1967 | Kaspaul et al. | 96—1.5 X |
| 3,317,732 | 5/1967 | Deeg | 252—501 X |
| 3,377,169 | 4/1968 | Blake | 96—88 |
| 3,386,823 | 6/1968 | Keller et al. | 96—27 |
| 3,440,046 | 4/1969 | Droege et al. | 96—27 |

OTHER REFERENCES

Kostyshin et al., "Photographic Sensitivity Effect in Thin Semiconducting Films on Metal Substrates," Soviet Physics—Solid State, vol. 8, No. 2, February 1966, pp. 451–452.

GEORGE F. LESMES, Primary Examiner

R. E. MARTIN, Assistant Examiner

U.S. Cl. X.R.

96—1.5, 27, 33, 36, 36.2, 38.4; 156—3, 4, 17, 18; 250—49.5 R, 49.5 E, 65, 65.1